United States Patent [19]

Macauley et al.

[11] Patent Number: 5,750,226
[45] Date of Patent: May 12, 1998

[54] LIGHT EXCLUDING MULTI-LAYER PLASTIC BARRIER BOTTLE

[75] Inventors: Richard Peter Macauley, Westerville; Lewis Henry Sita, Worthington; Elwood Lamar Stokesbury, Westerville, all of Ohio

[73] Assignee: Abbott Laboratories, Abbott Park, Ill.

[21] Appl. No.: 204,715

[22] Filed: Mar. 2, 1994

[51] Int. Cl.$^6$ .................................................. B29D 22/00
[52] U.S. Cl. ...................... 428/36.4; 428/35.7; 428/36.7; 428/903.3; 206/497; 206/524.3; 206/524.4; 215/12.1; 215/12.2
[58] Field of Search ................... 428/35.7, 36.4, 428/36.7, 903.3; 206/497, 524.3, 524.4; 215/1 C, 12 R, 12.2

[56] References Cited

U.S. PATENT DOCUMENTS

| | | | |
|---|---|---|---|
| 4,051,265 | 9/1977 | Kirshenbaum | 426/107 |
| 4,094,407 | 6/1978 | Hurst | 206/524.3 |
| 4,846,359 | 7/1989 | Baird et al. | 215/12.2 |
| 5,104,390 | 4/1992 | Yum | 604/323 |
| 5,123,554 | 6/1992 | Arvidson et al. | 215/12.2 |

*Primary Examiner*—Charles Nold
*Attorney, Agent, or Firm*—Brian R. Woodworth

[57] ABSTRACT

A multi-layer coextrusion blow molded plastic container adapted to be filled with a light-sensitive low acid liquid nutritional product and which container has a multilayer wall, of which at least three layers contain at least 1% but not more than 8% by weight of titanium dioxide, said titanium dioxide being responsible for reducing the extent of light transmission through said container by at least 99%.

3 Claims, 2 Drawing Sheets

5,750,226

LIGHT EXCLUDING MULTI-LAYER PLASTIC BARRIER BOTTLE

TECHNICAL FIELD

The present invention relates generally to a multilayer plastic container, and more particularly to a light excluding multilayer plastic container for use with light sensitive low acid liquid nutritional products.

BACKGROUND OF THE INVENTION

Low acid liquid food products generally contain nutrients which are light and temperature sensitive. Examples of such liquid foods are nutritional products for infants and nutritious products for persons having specific medical conditions. Exposure to high temperatures or to light results in damage to the biological activity of these nutrients and a consequent loss of nutritive value of the liquid food product. Prolonged exposure to elevated temperatures are encountered during sterilization of the liquid food product under usual retort sterilization conditions. This problem may be overcome by using aseptic packaging technology. Light sensitive nutrients are extremely sensitive to even minute amounts of light and are degraded thereby. Exposure to light generally occurs during shelf storage of the bottled product.

Prior to the instant invention, there was no known solution, other than extraneous wrapping in a light barrier material, to the problem of light sensitivity of nutrients in a low acid liquid food product stored in a plastic container. Most known plastic containers may not be filled with light and heat sensitive liquid food products as the length of time and high temperatures required for retort sterilization processes result in unacceptable deformation of such containers and/or damage to the highly heat sensitive food products contained therein. Further all known plastic containers which are suitable for containing low acid liquid nutritional products do not prevent light from entering the container, such light being the cause of nutrient degradation and concomitant loss of bioactivity. As used herein and in the claims a "low acid liquid nutritional product" is a liquid nutritional product, other than alcoholic beverages, with a finished equilibrum pH of greater than 4.6. A low acid liquid nutritional product must be made commercially sterile using heat. The present invention relates to an opaque semi-rigid plastic container which overcomes the problems of both heat and light exposure. The instant invention overcomes the problem of prolonged heat exposure by enabling the use of aseptic filling methods to overcome the problem of prolonged elevated nutrient damage caused by temperatures required by retort sterilization. Following aseptic prefilling with a heat sterilized liquid food product, the filled container may be aspetically sealed with an aluminum-plastic sheet. The problem of light sensitive nutrient degradation is overcome by the composition of the material forming the multilayer plastic container of the instant invention having titanium dioxide ($TiO_2$) in certain layers of the plastic, said $TiO_2$ substantially reducing the penetration of light through the plastic material thereby preventing light degradation of the light sensitive nutrients.

SUMMARY OF THE INVENTION

The present invention relates to a new and novel semi-rigid plastic container which, due to its composition and method of fabrication, may be aseptically filled with a highly heat or light sensitive low acid liquid food product. These aseptically filled containers will have a long shelf life whereby a hospital, nursing home, other health facilities or retail stores may maintain an inventory of easily storable, ready-to-use semi-rigid containers of sterilized nutritionally stable low acid liquid nutritional products for tube- or oral feeding of its patients or customers. As a consequence of the titanium dioxide content in the walls of the plastic container, special precautions to prevent exposure to light are not needed as a result of the instant invention. This unique container is formed by a co-extrusion blow-molding process with the multi-layer coextrusion being characterized by having at least one high-oxygen-barrier layer and a titanium dioxide content in at least three of the layers. While the aforementioned composition may be used in the co-extrusion of any plastic container it may also be applied to specific containers designed specifically for the purpose of eliminating container deformation during the ultra-high temperature sterilization step. One such container is that disclosed in U.S. Pat. No. 5,123,554 to Arvidson et al. This container design is formed with a ribbed formation on one or more of the sidewalls thereof which increases the heat transfer properties thereof and thus reduce the high-heat sterilization process time and thus the likelihood of container deformation and/or damage to the highly heat sensitive contents thereof.

DESCRIPTION OF THE PREFERRED EMBODIMENT

Historically, retortable containers had to be fabricated of glass or metal as plastics have relatively low thermal conductivity and low melting points. However, plastic containers do have greater consumer appeal than glass or metal containers and the previous concerns as to retortable plastic containers have now been overcome as disclosed in U.S. Pat. No. 5,123,554 to Arvidson et al. However this patent does not suggest, disclose or claim methods for overcoming any of the problems caused by light degradation of light sensitive nutrients. Further, none of the known prior art overcomes the problem of preventing exposure to light of the product contained in retortable plastic containers, such exposure causing degradation of light sensitive nutrients. The instant invention overcomes the problem of light degradation by preventing the transmission of light through the walls of the plastic container. Prevention of light transmission is achieved by incorporating titanium dioxide into at least three layers of the multilayered wall of the container.

Figure 1:
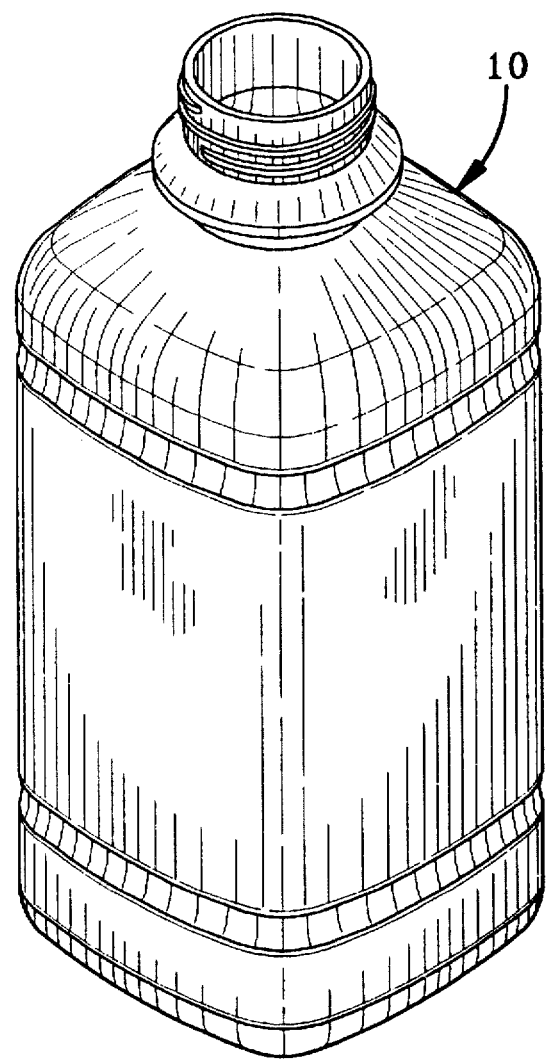
FIG. 1 is a perspective view of a retortable, coextrusion blow-molded, semi-rigid plastic container embodying the invention, shown in its upright position.
Figure 4:
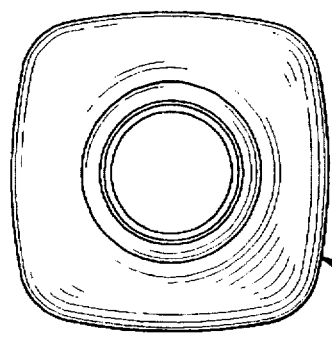
FIG. 4 is a top plan view thereof.
Figure 2:
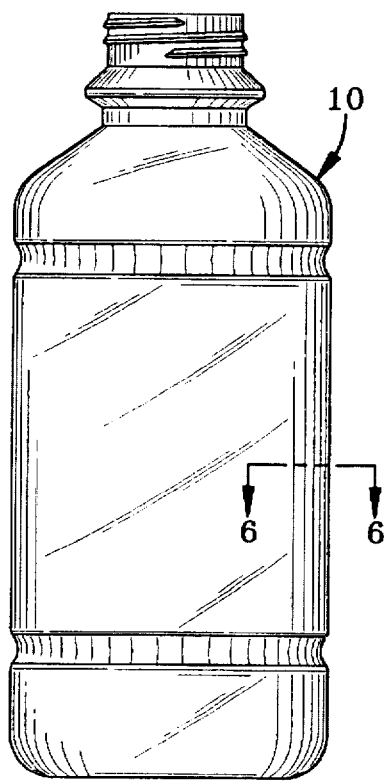
FIG. 2 is a front elevational view thereof, the rear elevation being the same except for the conventional screw threading on the bottle neck.
Figure 3:
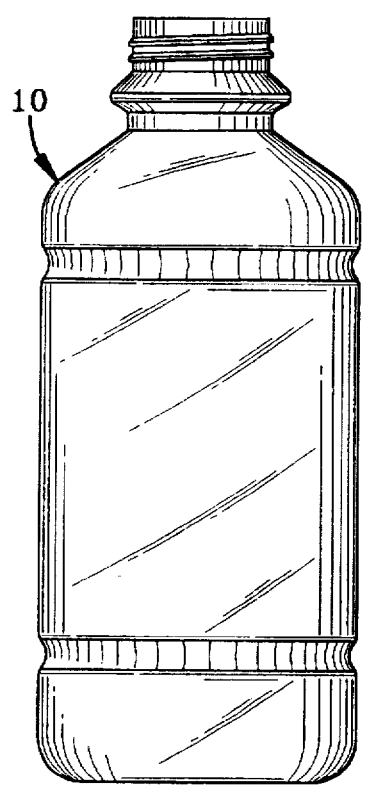
FIG. 3 is a right side elevational view thereof, the left side being the same except for the conventional screw threading on the bottle neck.
Figure 5:
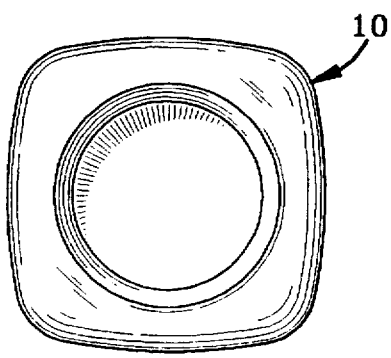
FIG. 5 is a bottom plan view thereof.

Referring now to the drawings, a preferred form of semi-rigid plastic container 10 embodying the present invention is shown in its upright filling in FIGS. 1 and 2. This container because of its unique structure, composition, and method of fabrication, may be filled with a highly heat and light sensitive low acid liquid nutritional product and then heated in retort to sterilize said product. Alternatively, the container may be filled and sealed using aseptic processing. This plastic container 10 of low acid liquid nutritional product has a long shelf life whereby hospitals, nursing homes, other health facilities, or retail outlets may maintain an inventory of easily storable, ready-to-use, semi-rigid, plastic containers of sterilized nutritional products for tube or oral feeding of its patients or customers. The shelf life of the product is prolonged due to the increased stability resulting from the exclusion of light from the product and hence the diminished level of degradation of light sensitive nutrients.

Figure 6:
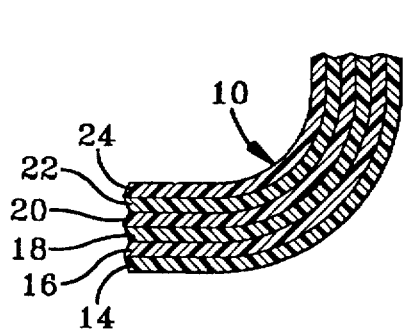
FIG. 6 is an enlarged fragmentary horizontal sectional view illustrating the layered structure of the container wall and taken generally along line 6—6 of FIG. 2.

With reference to FIG. 6, the multi-layered wall structure of the container 10 is characterized by outer and inner layers 14 and 24 both of which are of food grade polypropylene having a minimum thickness of 0.002 inches, a regrind layer 22 adjacent the inner layer, a pair of high temperature adhesive layers 16 and 20, such as 0.0015 inch polyolefin disposed adjacent the regrind layer 22 and the inner layer 24, respectively, and, between the two high temperature adhesive layers 16 and 20, an oxygen barrier layer 18 of ethyl-vinyl-alcohol (EVOH) having a thickness of from 0.0005 to 0.002 inches. The reduced light transmission of a container according to the present invention is a result of the inclusion of titanium dioxide in the two polypropylene layers 14 and 24 and in the regrind layer 22. In order to sufficiently reduce light transmission, titantium dioxide must be present at a concentration of at least 2% but not more than 8% wt/wt in each of the two polypropylene layers 14 and 24 and at a concentration of at least 1% but not more than 8% wt/wt in the regrind layer 22.

A container in accordance with the present invention has utility for packaging low acid liquid nutritional products packaged using either aseptic techniques or post-packaging retort. By using good engineering practices an engineer may minimize the length of the heating portion of the sterilization cycle so as prevent damage to the various heat highly heat-sensitive nutritional products to be contained therein, minimizing distortion of the semi-rigid, but relatively thin-walled, plastic containers during the heat-up and cool-down cycles of the sterilization step of the method, and minimizing transmission of light through the multilayered wall of the container and hence minimizing exposure and thus light degradation of the highly light sensitive nutritional products to be contained therein. Accordingly the shelf storage time of the light sensitive low acid liquid nutritional products contained in said container is substantially increased.

The inclusion of titanium dioxide ($TiO_2$) in certain layers of the plastic composition not only results in the desired reduction of the transmission of light through the multilayered wall of the container but such inclusion also effects the viscosity of the material comprising the container. A $TiO_2$ content which is too high results in the production of a highly viscous material which cannot be easily extruded. Such highly viscous materials have no known practical purpose since they cannot be molded into the desired container shape. Thus in order to optimize $TiO_2$ content, it was necessary to determine the amount of $TiO_2$ which not only effectively prevented light transmission but which also gave rise to a composition which is readily extruded. In a series of preliminary screening assays it was determined that a $TiO_2$ content of about or greater than 8% wt/wt in the two polypropylene layers 14 and 24 or in the regrind layer 22, resulted in a formulation which could not be extruded due to the high viscosity of the resultant composition. Thus it was determined to evaluate $TiO_2$ contents of less than 7% wt/wt only. Next, various $TiO_2$ concentrations in the two polypropylene layers 14 and 24 and the regrind layer 22 were evaluated for their effectiveness in preventing light transmission.

Light transmission was assessed using photo-diode detectors standard and well known in the art of light transmission measurements. A tungsten bulb was used as the illuminating light source and a broad band filter measuring at a wavelength of 450 nm was used to measure the degree of light transmitted through the various wall compositions of standardized thickness. The amount of transmitted light was expressed as a percent of the unimpeded illuminating tungsten light source. A multilayered plastic bottle having the same composition as disclosed herein but containing no $TiO_2$, permitted about 43% of the illuminating light to be transmitted through the wall material. Table 1 illustrates the effect of titanium dioxide content on light transmission through the multilayered wall of the container.

TABLE 1

Summary of Light Transmission Results as A Function of Titanium Dioxide Content.

| Type # | $TiO_2$ Content (% by wt) | % Light Transmission | Comments |
| --- | --- | --- | --- |
| 1 | 0% PP/0% RG/0% PP | 43 | DNMC[1] |
| 2 | 2% PP/1% RG/2% PP | 0.34 | DNMC[1] |
| 3 | 4% PP/1% RG/4% PP | 0.13 | Acceptable[2] |
| 4 | 8% PP/1% RG/8% PP | 0.08 | Extrusion not possible |
| 5 | 4% PP/2% RG/4% PP | 0.17 | DNMC[1] |
| 6 | 6% PP/1.5% RG/6% PP | 0.13 | Acceptable[2] |
| 7 | 4% PP/4% RG/4% PP | 0.08 | Acceptable[2] |
| 8 | 5% PP/5% RG/5% PP | 0.05 | Acceptable[2] |

[1]DNMC: Does not meet desired criteria of a light transmission value of less than 0.15% and that the composition is extrudable.
[2]Acceptable: Composition is extrudable and yields a light transmission value of less than 0.15%.

By way of explanation of the experimental data in Table 1, it should be noted that the $TiO_2$ content is expressed as percent by weight of a layer for the content in each of the two polypropylene layers 14 and 24, and in the regrind layer 22. For the sake of ease of understanding the polypropylene layers are referred to as PP and the Regrind layer is referred to as RG in Table 1. By way of illuminating example, a composition designated as 4%PP/2%RG/4%PP, simply means that each of the two PP layers contained 4% by weight of $TiO_2$ whereas the RG layer contained 2% $TiO_2$ by weight. A composition designated as 6%PP/1.5%RG/6%PP is such that each of the PP layers contains 6% $TiO_2$ by weight whereas the RG layer contains 1.5% by weight $TiO2$. The percent light transmitted through the various compositions is expressed as a percent of the illuminating light source. The higher this value, the less effective is the multilayered wall composition in retarding light transmission. A light transmission value of greater than about 0.5% is generally considered unacceptable since such a value will result in extremely rapid light induced degradation of Vitamin B2 in the low acid liquid nutritional product. For the reasons described in detail below, a container having a light transmission value of 0.5% will result in a liquid nutritional product having a stable shelf life of only about 60 days since acceptably low vitamin B2 levels, i.e. less than 1.01 mg/liter of product, will result as consequence of storage under these conditions. A shelf life of only 60-days is not considered acceptable. A stable shelf life of at least six months is preferred, nine months is more preferred and twelve months shelf life is most preferred.

The light sensitive nutrients contained in liquid nutritional products are extremely sensitive to light and are degraded by even only very small amounts of light. The nutrient most sensitive to light degradation is Vitamin B2, also known in the art as riboflavin. Light induced degradation of Vitamin B2 follows first order kinetics. Vitamin A is also sensitive to light degradation. In the instant invention standardized methods were used to assess light sensitive nutrient stability. The test employed simulates storage conditions to be found in the typical retail store. These simulated test conditions assume exposure of the product to 90 foot candles of flourescent light for 24 hours per day. This test is especially stringent and likely to represent the "worst case" scenario.

Stability of the liquid nutritional product, more particularly stability of the light sensitive nutrient and most especially vitamin B2, was then assessed as a function of storage time (in weeks or months) under these simulated storage conditions. Acceptability of the product is determined by the ability to measure the minimum medically accepted limit of Vitamin B2 content in a liquid nutritional product. In the product used in this study the minimum acceptable limit of vitamin B2 is 1.01 mg/liter for a product which is initially fortified at a level of 4.5 mg/liter of product. Clearly, the ability of a container to reduce light transmission will improve shelf stability of the product.

Table 2 illustrates the extent of light induced degradation of Vitamin B2 as a function of percent transmitted light. More specifically, Table 2 reports the storage time period (in months) for which it will be possible to retain an acceptable liquid nutritional product having a vitamin B2 content of at least 1.01 mg/liter of liquid nutritional product initially fortified to a level of 4.5 mg of Vitamin B2 per liter of product and thereafter exposed to various degrees of transmitted light. These storage times are measured as a function of the percent of light transmitted through the walls of the container.

TABLE 2

VITAMIN B2 STABILITY (in months) AS FUNCTION OF % TRANSMITTED LIGHT[1]

| % Light Transmission | Stability Period[2] (months) |
|---|---|
| 0.12 | 12 |
| 0.15 | 9 |
| 0.2 | 6 |
| 0.25 | 4 |
| 0.35 | 3 |
| 0.5 | 2 |
| 0.6 | 1.5 |
| 1.0 | 1 |

[1]90 foot candle constant flourescent light exposure for 24 hours per day.
[2]Vitamin B2 content of at least 1.01 mg/liter measured at the indicated time point for each of the % light transmission values shown. The nutritional liquid product was initially fortified to a Vitamin B2 level of 4.5 mg/liter of product.

It is generally considered desirable, to develop liquid nutritional products which have a shelf life of at least six months, more preferably nine months and most preferably about twelve months. As discussed above, product shelf life is in large measure determined by the ability to measure at least 1.01 mg of Vitamin B2 per liter of product. As also noted above, Vitamin B2 shelf life stability can be prolonged by reducing the amount of transmitted light to which the product is exposed. In particular, Table 2 reveals that it is possible to achieve a 6–12 months shelf stability by ensuring that the product is exposed to no more than 0.2% of the transmitted light generated by a 90 foot candle constant source. Thus, in order to be acceptable, the $TiO_2$ content of the multilayered wall composition of the instant invention is required to prevent at least about 99.8%, more preferably about 99.85% and most preferably about 99.88% of the illuminating light from being transmitted through the composition. If more than 0.2% of the illuminating light source is able to penetrate the multilayered wall composition, then that composition is considered unacceptable for the intended purpose.

Based on the results presented in Table 1, the compositions denoted as Types # 6, 7 and 8 were evaluated further and used in the manufacture of containers by means of a co-extrusion process. The bottles formed from these compositions were then filled with a low acid liquid nutritional product containing a light sensitive nutrient, aseptically processed and sealed. The bottles were filled with the commercially available liquid nutritional product, Similac® with Iron, a product manufactured by the Ross Products Division of Abbott Laboratories, Columbus, Ohio. This product was not fortified with additional Vitamin B2. The zero time concentration of Vitamin B2 in Similac® with iron is about 1.97 mg/liter. Shelf stability of the nutritional product was assessed as a function of shelf storage time when exposed 24 hours per day to a 90 foot candle constant flourescent light source. The assessment of stability was made by biochemical analysis of the light sensitive nutrient, Vitamin B2 (Riboflavin). The stability of the samples were assessed at times periods of 2, 3, 4, 6, 9 and 12 months following aseptic sealing. Each measurement was performed at least in duplicate and generally in triplicate. Separate containers were assessed for each time point. At least two containers for each of the three types of wall material for each time point were assessed. Table 3 is a summary of shelf stability as function time for the liquid nutritional product stored in containers made from each of the three wall material compositions, i.e. Types 6, 7 an 8.

TABLE 3

VITAMIN B2 STABILITY DATA
(Total % Remaining)[1]
Storage Time (In Months)

| Composition | | 0 | 2 | 3 | 4 | 6 | 9 | 12 |
|---|---|---|---|---|---|---|---|---|
| Type 6 | | 100 | 74 | 65 | 56 | 41 | 28 | 31 |
| | | | 70 | 68 | 58 | 47 | 25 | 24 |
| | Average | | 72 | 67 | 57 | 44 | 27 | 27 |
| Type 7 | | 100 | 68 | 58 | 57 | 36 | 28 | 20 |
| | | | 69 | 54 | 54 | 36 | 28 | 22 |
| | Average | | 68 | 56 | 56 | 34 | 28 | 21 |
| Type 8 | | 100 | 62 | 51 | 53 | 29 | 13 | 11 |
| | | | 70 | 55 | 49 | 30 | 24 | 9 |
| | Average | | 66 | 53 | 51 | 30 | 14 | 10 |

[1]Vitamin B2 stability assessed after continuous exposure to a 90 foot candle constant light source for the time periods indicated. Label requirement is 1.01 mg/liter. Initial (100%) Vitamin B2 concentration averaged 1.97 mg/liter.

It is clear from the experimental data presented in Table 3, that desired Vitamin B2 content of the non-fortified sample was achieved for up to 4 months. Up to that time period the measured Vitamin B2 content was at least the medically required lower limit value of 1.01 mg/liter. After 4-months, the measured level of vitamin B2 content was less than 1.01 mg/liter indicating a loss of stability.

It is well known and accepted in the art, that if the sealed product had of been fortified initially with up to 4.5 mg of Vitamin B2 per liter of product, that enhanced stability would have been achieved. In the case of a 4.5 mg/liter of fortified product, stability of the sample of up to twelve months will be easily achieved.

INDUSTRIAL APPLICATION

The invention disclosed herein provides multilayer plastic containers for low acid liquid nutritional products, said containers being capable of excluding greater than 99% of transmitted light, thereby substantially improving the shelf stability of light sensitive nutrients. There is an urgent consumer and commercial need to improve shelf stability of low acid liquid nutritional products stored in plastic containers. The instant invention fulfills that need.

While there has been shown and described a preferred embodiment of the invention, it would be obvious to those skilled in the art that changes and modifications may be made without departing from the invention, and it is intended by the appended claims to cover all such changes and modifications as fall within the true spirit and scope of the invention.

We claim:

1. A plastic container for a light sensitive nutritional product, comprising a multilayer plastic container, said container comprising a wall having six layers which comprise from the exterior of the container to the interior of the container: (a) a layer of food grade polypropylene; (b) a layer of high temperature adhesive; (c) a layer comprising an oxygen barrier of ethyl-vinyl-alcohol; (d) a layer of a high temperature adhesive; (e) a layer of regrind material; and (f) a layer of food-grade polypropylene; and wherein said polypropylene and regrind layers contain at least about 5% by weight and about 1% by weight respectively but not more than about 8% by weight of titanium dioxide, said titanium dioxide serving to reduce the extent of light transmission through said wall by at least about 99.5%.

2. A plastic container as recited in claim 1, said container being generally rectangular in configuration and having a front wall, a rear wall, a pair of side walls and a bottom wall.

3. A plastic container as recited in claim 1 wherein said polypropylene and regrind layers each contain at least about 5% by weight but not more than about 8% by weight of titanium dioxide, said titanium dioxide serving to reduce the extent of light transmission through said wall by at least 99.8%.

* * * * *